(12) United States Patent
Matsumoto

(10) Patent No.: US 8,391,285 B2
(45) Date of Patent: Mar. 5, 2013

(54) COMMUNICATION APPARATUS, COMMUNICATION SYSTEM, AND COMMUNICATION METHOD

(75) Inventor: Yuji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 12/858,049

(22) Filed: Aug. 17, 2010

(65) Prior Publication Data

US 2011/0044332 A1 Feb. 24, 2011

(30) Foreign Application Priority Data

Aug. 19, 2009 (JP) ................................. 2009-190127

(51) Int. Cl.
*H04L 12/56* (2006.01)
(52) U.S. Cl. .................. 370/389; 370/386; 370/397
(58) Field of Classification Search .................. 370/386, 370/389, 397, 400
See application file for complete search history.

(56) References Cited

U.S. PATENT DOCUMENTS

| | | | | |
|---|---|---|---|---|
| 5,936,956 A | * | 8/1999 | Naven | 370/395.7 |
| 5,999,514 A | * | 12/1999 | Kato | 370/231 |
| 6,058,114 A | * | 5/2000 | Sethuram et al. | 370/397 |
| 2002/0099995 A1 | * | 7/2002 | Furukawa | 714/766 |
| 2002/0131425 A1 | * | 9/2002 | Shalom | 370/401 |
| 2005/0249116 A1 | * | 11/2005 | Anderson | 370/229 |
| 2006/0233144 A1 | * | 10/2006 | Matsumoto | 370/338 |
| 2007/0286246 A1 | | 12/2007 | Kobayashi | |

FOREIGN PATENT DOCUMENTS

| JP | 2007-194732 A | 8/2007 |
|---|---|---|
| JP | 2009-09106 A | 1/2009 |

* cited by examiner

*Primary Examiner* — Dang Ton
*Assistant Examiner* — Mewale Ambaye
(74) *Attorney, Agent, or Firm* — Fujitsu Patent Center

(57) ABSTRACT

A communication apparatus configured to transmit data by configuring a plurality of virtual communication pathways in a physical communication pathway established with another communication apparatus, the communication apparatus includes a configuration unit that configures information related to an order of priority of the virtual communication pathways, a first storage unit that stores the configured information, a second storage unit that stores data, which includes signals, based on the configured information, and a transmission processing unit that carries out transmission processing on the stored data based on the configured information.

14 Claims, 16 Drawing Sheets

FIG.6

| STREAM NUMBER | ACCUMULATE DATA | STORE DATA IN DIFFERENT STREAMS | EXTENSION TIME | RE-EXTENSION |
|---|---|---|---|---|
| STREAM 1 | YES | YES | 200msec | YES |
| STREAM 2 | YES | YES | 200msec | YES |
| STREAM 3 | NO | NO | 0msec | NO |

| STREAM NUMBER | SELECTED SIGNAL | TRANSMISSION ORDER | ACCUMULATE DATA | STORE DATA IN DIFFERENT STREAMS | EXTENSION TIME | RE-EXTENSION |
|---|---|---|---|---|---|---|
| STREAM 1 | NOT IDENTIFIED | FIFO | YES | YES | 200msec | YES |
| STREAM 2 | NOT IDENTIFIED | FIFO | YES | YES | 200msec | YES |
| STREAM 3 | DATA SIGNAL | FIFO | YES | NO | 10msec | NO |
| STREAM 3 | CONTROL SIGNAL | LIFO | NO | NO | 0msec | NO |

COMMUNICATION APPARATUS, COMMUNICATION SYSTEM, AND COMMUNICATION METHOD

CROSS-REFERENCE TO RELATED APPLICATIONS

This application is based upon and claims the benefit of priority of the prior Japanese Patent Application No. 2009-190127, filed on Aug. 19, 2009, the entire contents of which are incorporated herein by reference.

FIELD

The embodiments discussed herein are related to a communication apparatus, a communication system, and a communication method.

BACKGROUND

Multistream packet transfer systems are known as digital display interfaces suitable for linking video sources to video display devices. With such a multistream packet transfer system, for example, one or more packet streams can be transferred simultaneously through a "virtual pipe" established within a physical link (for example, refer to Japanese Laid-Open Patent Publication No. 2009-9106). Optical network units (ONUs) and optical line terminators (OLTs) having traffic control functions are known in relation to systems carrying out data communication. For example, an ONU and an OLT monitor data accumulation for each priority class queue and transmit pause frames with priority class queue numbers to a network in the user's home and to a higher level network in order to request pausing/restarting of traffic transfer in priority class units. The ONU and the OLT receive, from the user's home or the higher level network, pause frames with priority class queue numbers, set the numbers in the priority class queue scheduler, and pause/restart traffic transfer in priority class units (for example, refer to Japanese Laid-Open Patent Publication No. 2007-194732).

In mobile communication systems, data of multiple streams is collectively transmitted between stations, such as a radio network controller (RNC) and a base station, for example. The data of multiple streams is collectively transmitted in data units, such as packets, for example. In such a case, if data is resent in a stream transmitting a larger amount of data or a stream with disrupted data transmission due to failure, etc., the data resending process is performed with priority. Thus, there is a problem in that even when data with high priority exists in another stream, this data with high priority is not transmitted until the resending process is completed.

SUMMARY

According to an aspect of the invention, A communication apparatus configured to transmit data by configuring a plurality of virtual communication pathways in a physical communication pathway established with another communication apparatus, the communication apparatus includes a configuration unit that configures information related to an order of priority of the virtual communication pathways, a first storage unit that stores the configured information, a second storage unit that stores data, which includes signals, based on the configured information, and a transmission processing unit that carries out transmission processing on the stored data based on the configured information.

Object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example table according to the second embodiment.

FIG. 15 illustrates an example table according to a third embodiment.

DESCRIPTION OF EMBODIMENTS

With reference to the accompanying drawings, embodiments of a communication apparatus, a communication system, and a communication method will be described in detail below.

First Embodiment

<Configuration of Communication Apparatus and Communication System>

Figure 1:
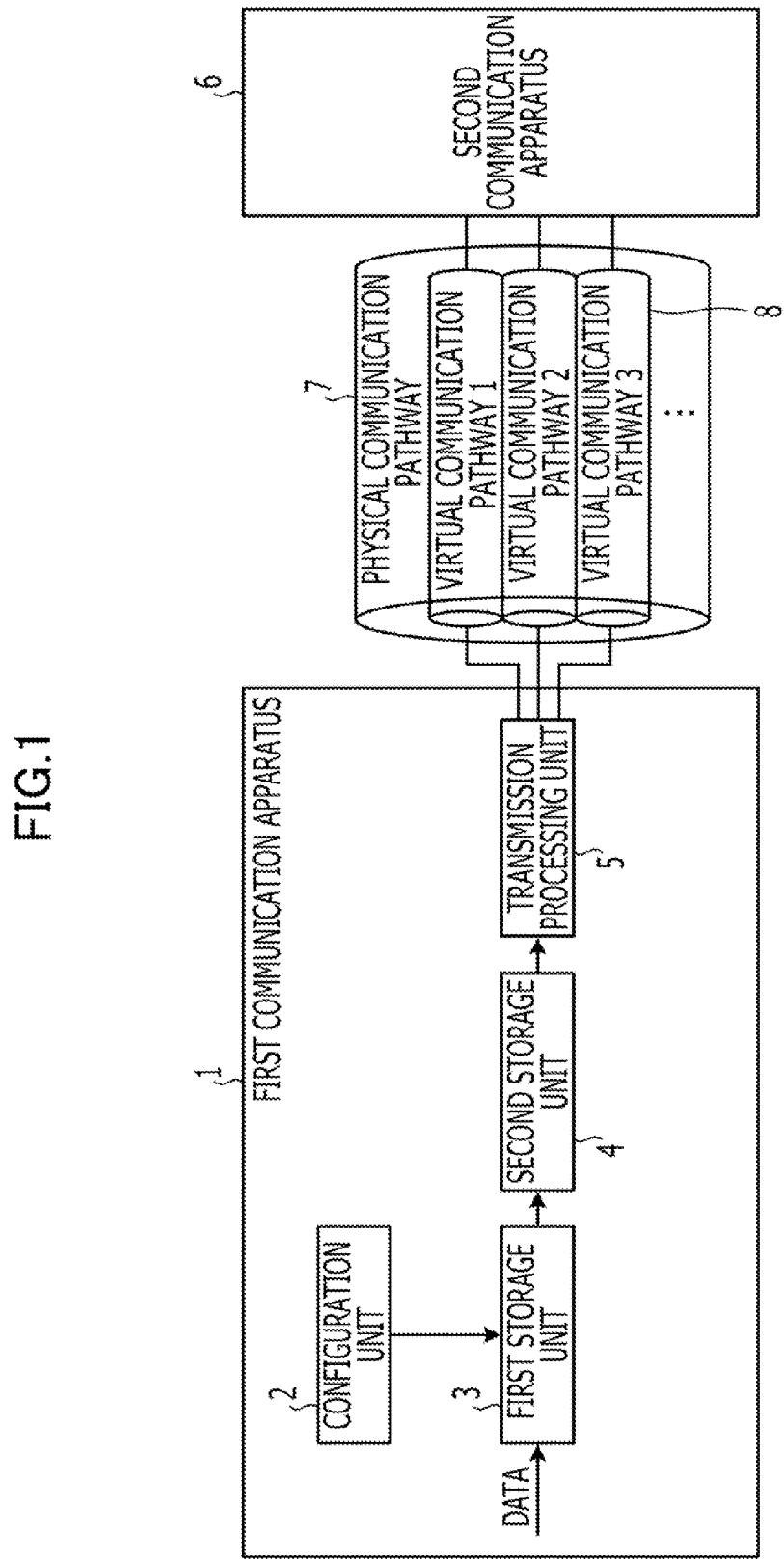
FIG. 1 is a block diagram illustrating the configuration of a communication apparatus and a communication system according to a first embodiment.

FIG. 1 is a block diagram illustrating the configuration of a communication apparatus and a communication system according to a first embodiment. As illustrated in FIG. 1, in the first embodiment, information related to the order of priority of virtual communication pathways is established in a physical communication pathway, and the transmission order of data sent through each virtual communication pathway is controlled on the basis of the configured information related to the order of priority. A physical communication pathway 7 is established between a first communication apparatus 1 on the data transmitting side and a second communication apparatus 6 on the data receiving side. A plurality of virtual communication pathways 8 is established in the physical communication pathway 7. The first communication apparatus 1 can transmit different sets of data to the second communication apparatus 6 via the physical communication pathway 7 by sending out different sets of data through each of the virtual communication pathways 8.

The first communication apparatus 1 includes a configuration unit 2, a first storage unit 3, a second storage unit 4, and a transmission processing unit 5. The configuration unit 2 configures information related to the order of priority of the virtual communication pathways 8. The information related to the order of priority of the virtual communication pathways configured by the configuration unit 2 is stored in the first storage unit 3. The data transferred from a source of transmission is stored in the second storage unit 4 on the basis of the information stored in the first storage unit 3. The transmission processing unit 5 carries out transmission processing on the data stored in the second storage unit 4 on the basis of the information stored in the first storage unit 3. The transmission processing unit 5 sends out the data on which transmission processing is carried out to the virtual communication pathway 8 used to transmit the data.

<Communication Method>

Figure 2:
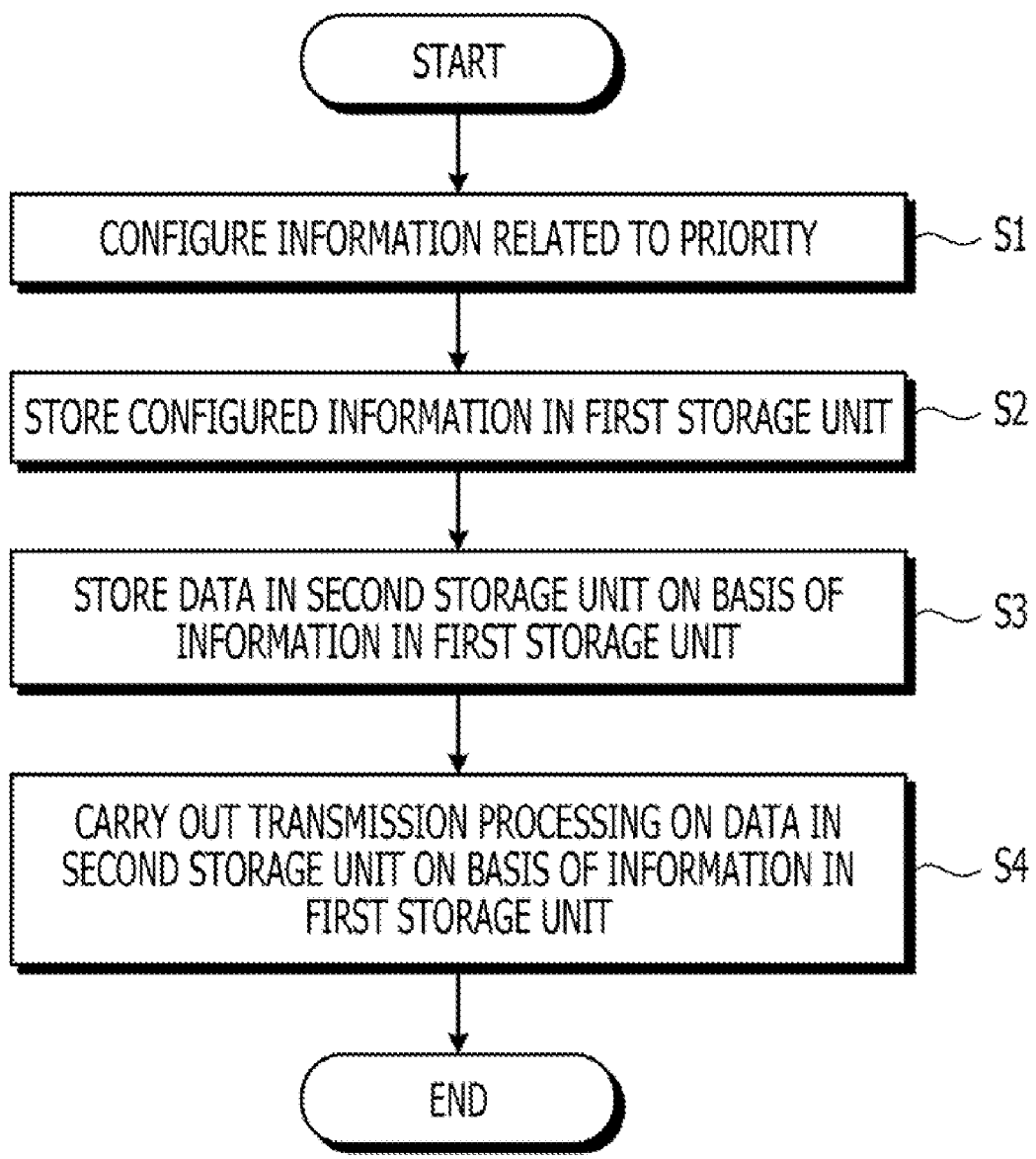
FIG. 2 is a flow chart illustrating a communication method according to the first embodiment.

FIG. 2 is a flow chart illustrating a communication method according to the first embodiment. As illustrated in FIG. 2, when communication processing is started at the first communication apparatus 1, the configuration unit 2 configures the information related to the order of priority of the virtual communication pathways 8 (Step S1). The information related to the order of priority of the virtual communication pathways configured by the configuration unit 2 is stored in the first storage unit 3 (Step S2). The data transferred from the source is stored in the second storage unit 4 on the basis of the information stored in the first storage unit 3 (Step S3). The transmission processing unit 5 carries out transmission processing on the data stored in the second storage unit 4 on the basis of the information stored in the first storage unit 3 (Step S4). The processed data is transmitted to the second communication apparatus 6 through the virtual communication pathway 8 corresponding to the data, and then the series shown in FIG. 2 ends.

According to the first embodiment, since the order of priority is set for each virtual communication pathway and the transmission order of data sent through the virtual communication pathways is controlled on the basis of the order of priority, data can be transmitted in accordance with the order of priority. Thus, even when data is requested to be resent through a virtual communication pathway transmitting a large amount of data or a virtual communication pathway with disrupted data transmission due to failure, data of higher priority sent through another virtual communication pathway can be transmitted with priority before the resending operation is started.

Second Embodiment

The communication apparatus and the communication system according to the first embodiment may be applied to a system standardized by, for example, the 3rd Generation Partnership Project (3GPP). In a second embodiment, an example applied to a system being standardized by the 3GPP will be described.

<Configuration of Communication Apparatus and Communication System>

Figure 3:
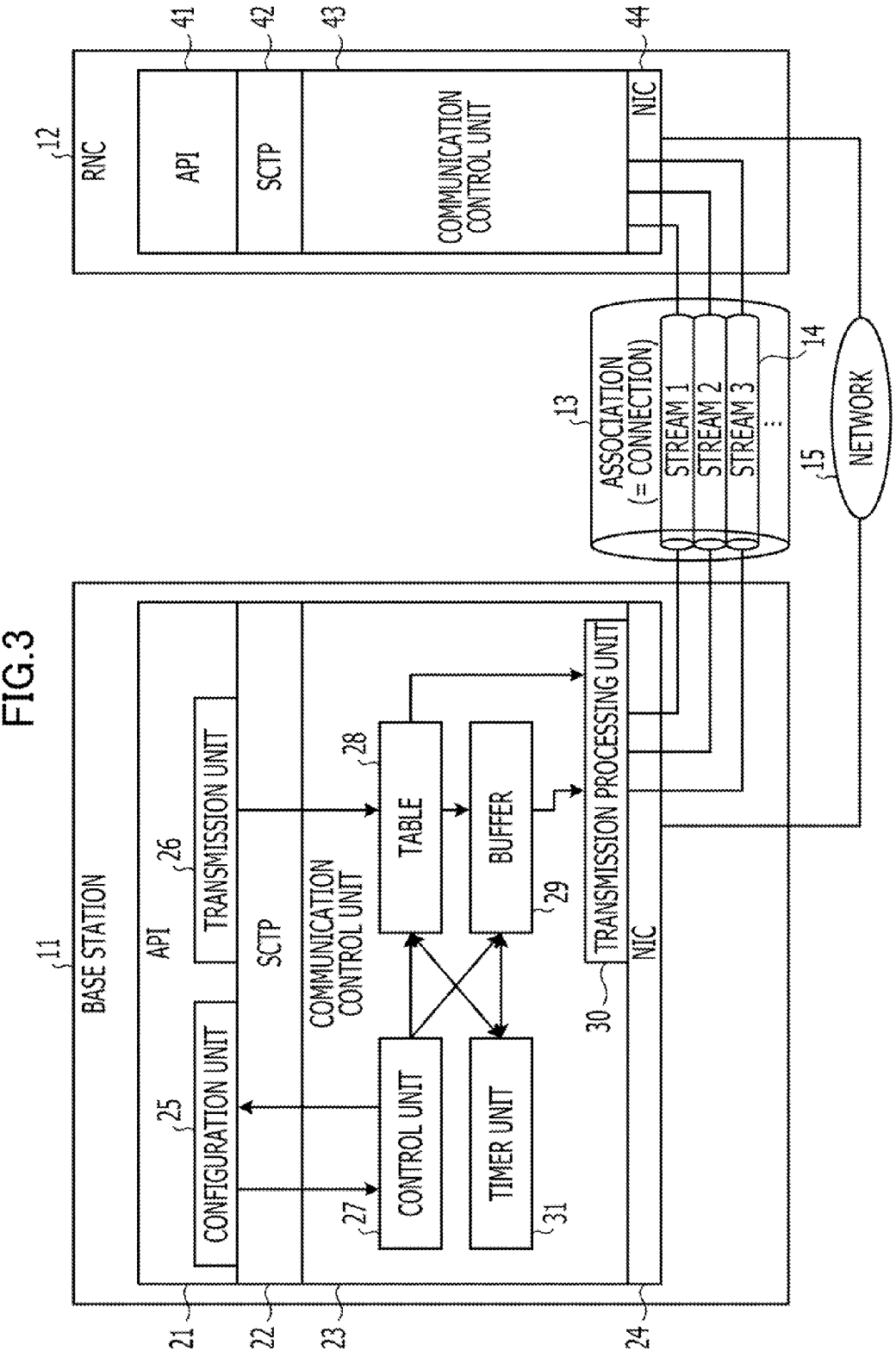
FIG. 3 is a block diagram illustrating the configuration of the communication apparatus and the communication system according to a second embodiment.

FIG. 3 is a block diagram illustrating the configuration of the communication apparatus and the communication system according to a second embodiment. A base station 11 illustrated in FIG. 3 is an example of a first communication apparatus according to the first embodiment. The base station 11 functions as a stream control transmission protocol (SCTP) server. A radio network controller (RNC) 12 is an example of a second communication apparatus according to the first embodiment. Hereinafter, the stream control transmission protocol is referred to as the SCTP, and the radio network controller is referred to as the RNC. The RNC 12 functions as a SCTP client. A communication pathway represented as an association 13 is an example of a physical communication pathway according to the first embodiment. When opposing devices have an association between each other, a pathway that enables communication is provided by establishing connection based on a communication protocol between the opposing devices. Here, an association refers to the established communication pathway. The term "connection" may be used for the same meaning as "association". A plurality of communication pathways represented as streams 14 is an example of virtual communication pathways according to the first embodiment.

The base station 11 includes an application program interface (API) 21, an SCTP 22, a communication control unit 23, and a network interface card (NIC) 24. Hereinafter, the application program interface is referred to as the API, and the network interface card is referred to as the NIC. The API 21 is an interface used by an application that carries out communication and controls the communication. The SCTP 22 is a protocol used when communication is carried out on an Internet protocol (IP) network.

With the SCTP, data having a length greater than a maximum transmission unit (MTU) value can be divided into data sets having a length equal to or smaller than the MTU value and transmitted to the receiving apparatus. In computer networking, the maximum transmission unit (MTU) of a communications protocol of a layer is the size (in bytes) of the largest protocol data unit that the layer can pass onwards. The MTU value is the maximum value of data that can be transmitted at once. With the SCTP, data sets having a length smaller than the MTU value can be transmitted collectively to the receiving apparatus as one data item so long as the total length does not exceed the MTU value (refer to "Data Structure in SCTP"). With the SCTP, data is transmitted to the receiving apparatus when the length of the collective data item reaches the MTU value or when a specified and/or predetermined amount of time elapses after the data is stored in a buffer, which will be described below. With the SCTP, a plurality of streams is configured in one association to send out data sets simultaneously through the plurality of streams. The operation of sending out data sets simultaneously through a plurality of streams is sometimes referred to as multistreaming.

The communication control unit 23 controls data passing between the SCTP 22 and the NIC 24. The NIC 24 is connected to a network 15 and transmits and receives data to and from the base station 11 and the network 15. The Internet is an example of the network 15.

The API 21 includes a configuration unit 25 and a transmission unit 26. The configuration unit 25 configures option information of the order of priority of the streams 14 and passes the option information to the communication control unit 23. By setting the priority option information by the configuration unit 25, priority of each of the streams 14 is set in the communication control unit 23. The transmission unit 26 transmits data including control signals and data signals from an application to the communication control unit 23. The transmission unit 26 is equivalent to a data source. As described below, data passed from the transmission unit 26 to the communication control unit 23 includes information for identifying the stream 14 the data belongs to (see the "Data Structure of SCTP" described below).

The communication control unit 23 includes a control unit 27, a table 28, a buffer 29, a transmission processing unit 30, and a timer unit 31. The control unit 27 registers the option information passed from the configuration unit 25 to the table 28 as information related to the order of priority. The control unit 27 generates the buffer 29. The information related to the order of priority of the streams 14 is stored in the table 28. The table 28 controls data accumulation in the buffer 29 and the order of priority of data output to each of the streams 14 on the basis of the stored information related to the order of priority. The buffer 29 accumulates data sent from the transmission unit 26 on the basis of the information related to the order of priority in the table 28. The table 28 and the buffer 29 are realized by, for example, memories. The table 28 is an example of a first storage unit. The buffer 29 is an example of a second storage unit. The timer unit 31 has a timer function and delays the output timing of data accumulated in the buffer 29 to the streams 14. The transmission processing unit 30 outputs the data accumulated in the buffer 29 or the data sent from the transmission unit 26 to the streams 14.

The RNC 12 includes an API 41, an SCTP 42, a communication control unit 43, and an NIC 44. The API 41 is an interface that controls communication and is used by the application that carries out communication. The SCTP 42 is a protocol used when communication is carried out on an IP network. The communication control unit 43 controls data passing between the SCTP 42 and the NIC 44. The NIC 44 transmits and receives data to and from the RNC 12 and the network 15.

<Data Structure in SCTP>

Figure 4:
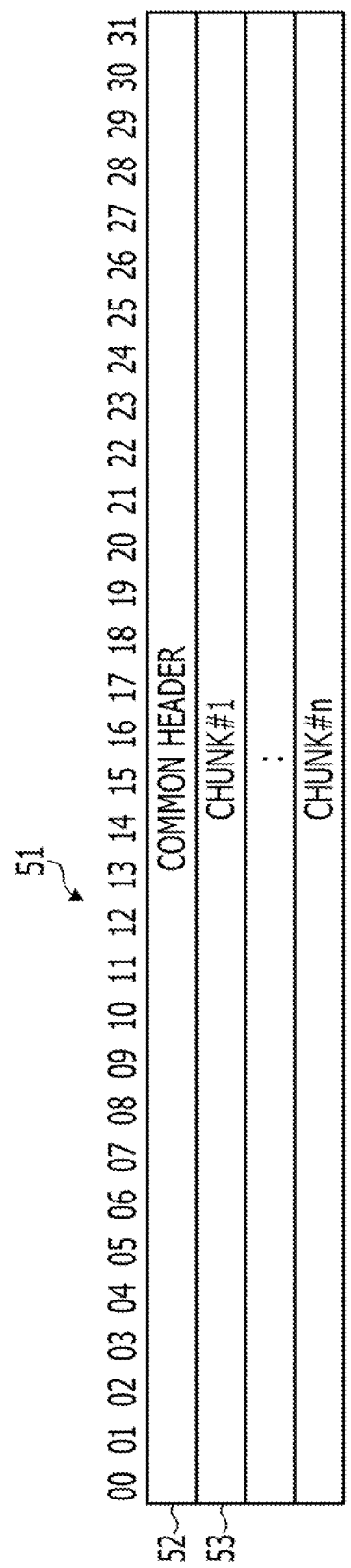
FIG. 4 illustrates a data format in a Stream Control Transmission Protocol (SCTP).

FIG. 4 illustrates a data format according to the SCTP. As illustrated in FIG. 4, a data item 51 includes a common header 52 and an arbitrary number of chunks 53 of data, and each has size of bit 00-31. One data item 51 may include multiple chunks 53 so long as the length of the data item 51 does not exceed the MTU value.

Figure 5:
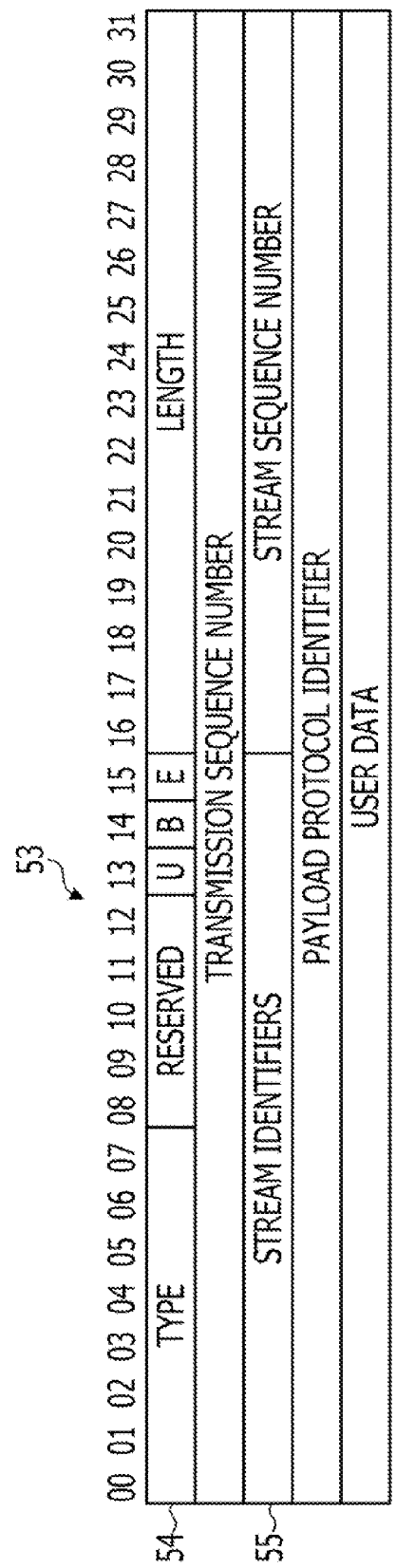
FIG. 5 illustrates a chunk format in the SCTP.

FIG. 5 illustrates a chunk format according to the SCTP. As illustrated in FIG. 5, the chunk 53 includes a TYPE field 54 which located in bit 00-07, a RESERVED field, a U-bit field, a B-bit field, a E-bit field, a LENGTH field, a TSN field, a Stream Identifier field 55, a Stream Sequence Number field, a Payload Protocol Identifier field and a USER DATA field. A value indicating whether the chunk 53 includes data signal data or control signal data is stored in the type field 54. According to the data structure illustrated in FIG. 4, each chunk 53 is identified on the basis of the information in the type field 54. Information for identifying the stream 14 to which the chunk 53 belongs is stored in the stream identifier field 55. An example of information for identifying the streams 14 is numbers (stream numbers) attached to the streams 14.

<Example of Table>

FIG. 6 illustrates an example table according to the second embodiment. As illustrated in FIG. 6, option information about stream number, data accumulation, storing data from different streams, extension time, and re-extension, is stored in the table 28. Accordingly, in this embodiment, the configuration unit 25 configures option information to include information about stream number, data accumulation, storing data from different streams, extension time, and re-extension.

The information about data accumulation indicates whether or not data is to be accumulated in the buffer 29. When the information about accumulation indicates "with accumulation" (YES in the Accumulate Data column of table 28), data is accumulated in the buffer 29. When the information about accumulation indicates "without accumulation" (NO in the Accumulate Data column of table 28), data sent from the transmission unit 26 is not accumulated in the buffer 29 and is sent to the transmission processing unit 30. The information about storing data from different streams indicates whether or not data items are to be collectively accumulated in the buffer 29 without being separated according to the streams 14 they belong to. When the information about storing data from different streams indicates that data items are to be accumulated in the buffer 29 without regard to the different streams (NO in the Store Data in Different Streams column of table 28), the data items are collectively accumulated in the buffer 29 without being separated according to the streams 14 they belong to. When the information about storing data from different streams indicates that data items are to be accumulated in the buffer 29 in accordance to respective streams associated with the data items (YES in the Store Data in Different Streams column of table 28), the data items are separated according to the streams 14 they belong to and are accumulated in the buffer 29. The information about extension time indicates the amount of time that elapses between the moment data is stored in the buffer 29 and the moment transmission processing of the data starts. When the extension time is zero, transmission processing is carried out substantially immediately on the data sent from the transmission unit 26 by the transmission processing unit 30. When the extension time is not zero, transmission processing is carried out on the data sent from the transmission unit 26 by the transmission processing unit 30 after a delay by the amount of time indicated in the information about the extension time. The information about re-extension indicates whether or not to extend again the amount of time between the moment data is stored in the buffer 29 and the moment transmission processing of the data starts. When re-extension is carried out, the amount of time is extended again. When re-extension is not carried out, the amount of time is not extended.

<Processing of Storing Option Information About Priority in Table>

Figure 7:
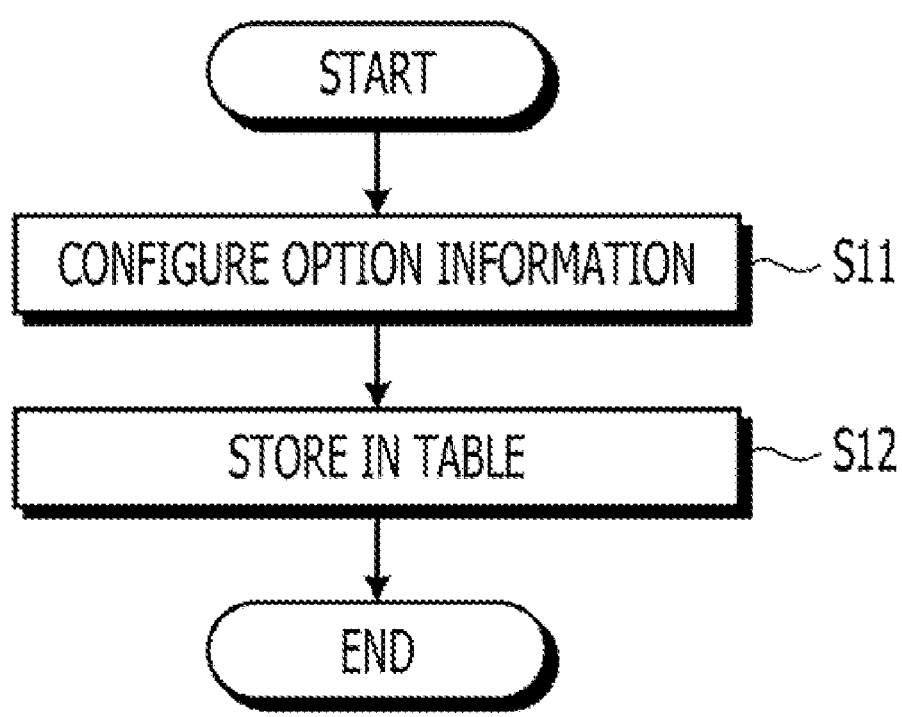
FIG. 7 is a flow chart illustrating the processing steps of storing option information about priority in the table according to the second embodiment.

FIG. 7 is a flow chart illustrating the processing steps of storing option information about priority in a table according to the second embodiment. As illustrated in FIG. 7, when the processing of storing the option information about priority in the table begins, first, option information is configured (Step S11). Then, the option information is stored in the table 28, and the processing ends (Step S12).

<Processing of Transmitting Data>

Figure 8:
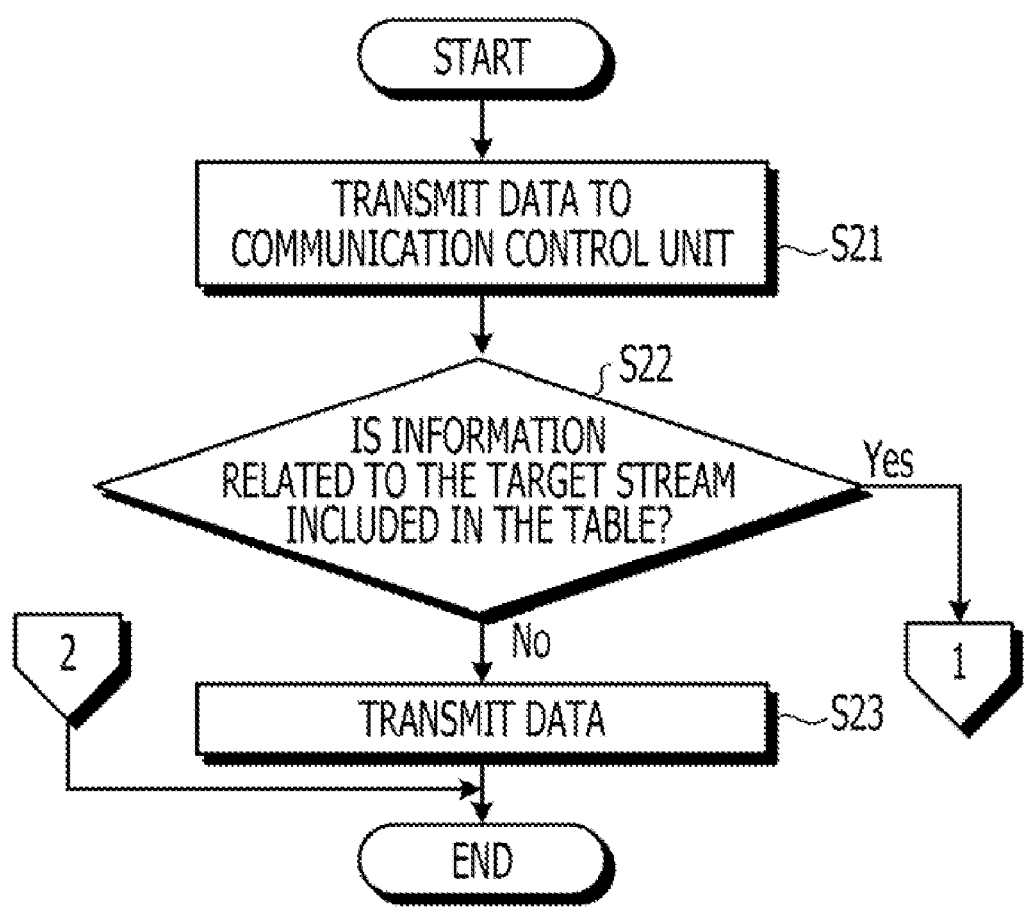
FIG. 8 is a flow chart illustrating the processing steps of transmitting data according to the second embodiment.

FIGS. 8 to 11 are flow charts illustrating the processing steps of transmitting data according to the second embodiment. As illustrated in FIG. 8, when the processing of transmitting data begins, first, data (hereinafter, referred to as "target data") is transmitted from the transmission unit 26 to the communication control unit 23 (Step S21). It is determined whether or not the option information about priority stored in the table 28 includes information related to the stream (hereinafter, referred to as "target stream") to which the target data belongs (Step S22). When there is no information related to the target stream (Step S22, NO), the target data is transmitted from the transmission processing unit 30 (Step S23), and the processing ends.

Figure 9:
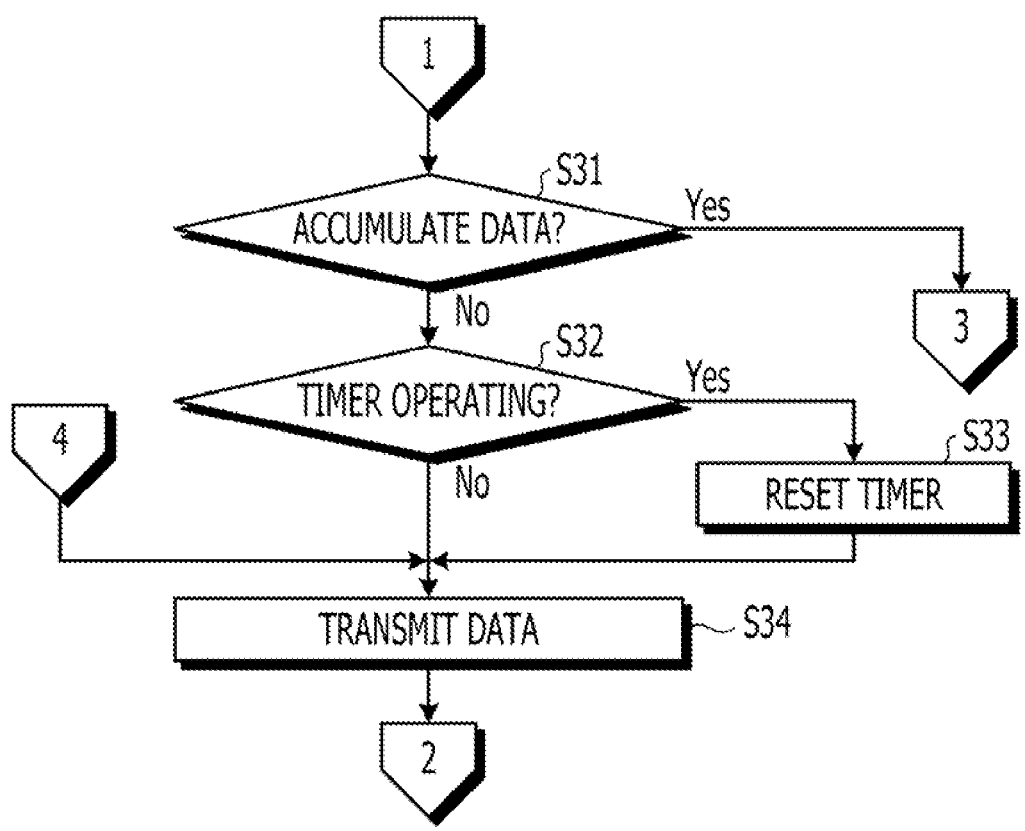
FIG. 9 is a flow chart illustrating the processing steps of transmitting data according to the second embodiment.

When there is information related to the target stream (Step S22, YES), as illustrated in FIG. 9, it is determined whether or not the information about accumulation for the target stream indicates "with accumulation" (Step S31). When the information about accumulation indicates "without accumulation" for the target stream (Step S31, NO), it is determined whether or not the timer function of the timer unit 31 is operating (Step S32) for a stream, which is not the target stream (hereinafter, referred to as "non-target stream") but is also a subject of the option information about priority stored in the table 28 and on which re-extension is to be carried out. When the timer is operating for the non-target stream (Step S32, YES), the timer for the non-target stream is reset by the extension time set for the non-target stream (Step S33). Then, the target data is transmitted from the transmission processing unit 30 (Step S34), and the processing ends. When the timer is not operating for the non-target stream in Step S32 (Step S32, NO), the target data is transmitted from the transmission processing unit 30 (Step S34), and the processing ends.

Figure 10:
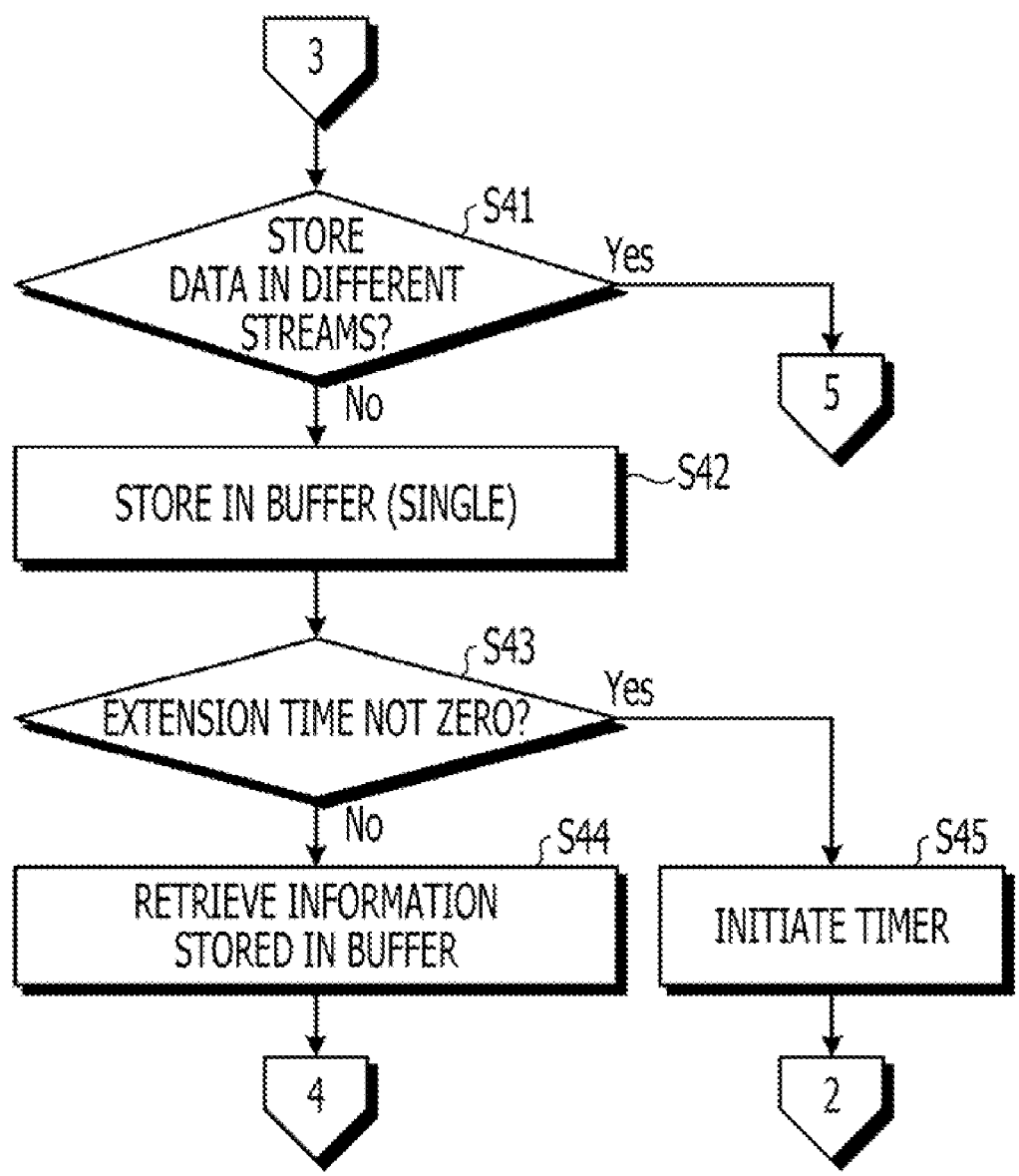
FIG. 10 is a flow chart illustrating the processing steps of transmitting data according to the second embodiment.

When the information about accumulation indicates "with accumulation" for the target stream in Step S31 (Step S31, YES), as illustrated in FIG. 10, it is determined whether or not the information about storing data from different streams indicates that data from different streams is to be stored for the target stream (Step S41). When the information about storing data from different streams indicates that data from different streams is not to be stored for the target stream (Step S41, NO), the single item of target data is stored in the buffer 29 (Step S42). Subsequently, it is determined whether or not the extension time of the target stream is zero (Step S43). When the extension time of the target stream is zero (Step S43, NO), storage information in the buffer 29 is retrieved (Step S44), the target data is transmitted from the transmission processing unit 30 (Step S34), and the processing ends. When the extension time of the target stream is not zero in Step S43 (Step S43, YES), the timer is initiated (Step S45), and the processing ends. When time-out occurs in the timer initiated in Step S45, "Processing Carried Out When Time-out Occurs in Timer" described below is carried out.

Figure 11:
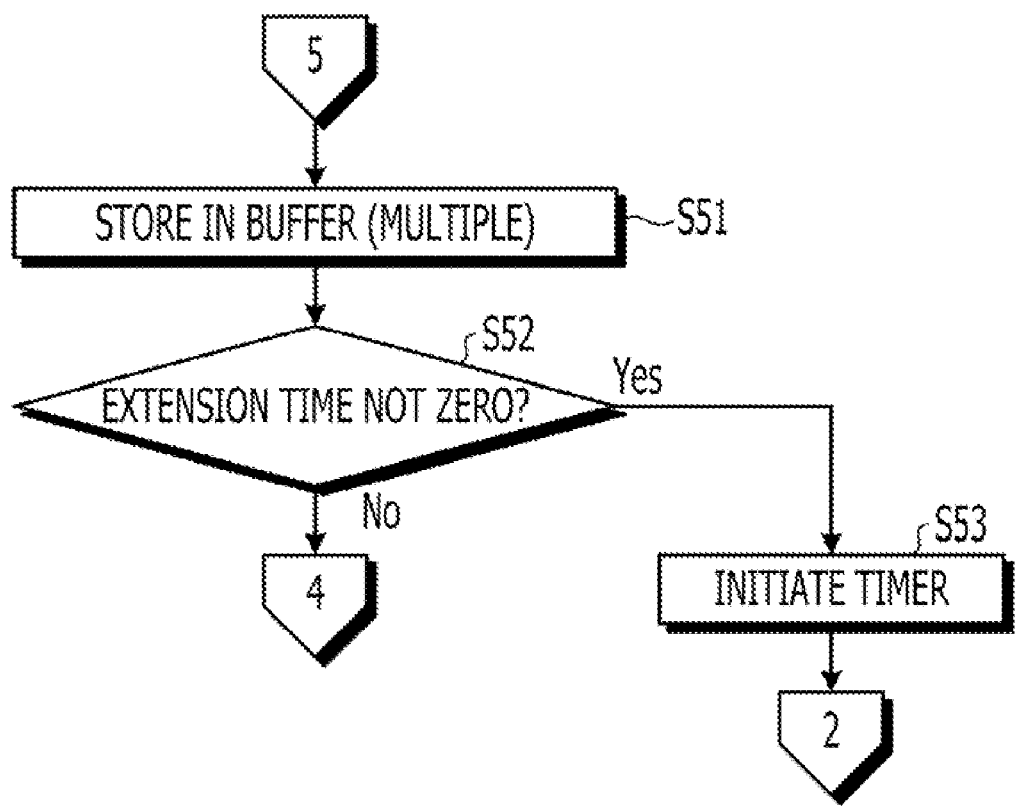
FIG. 11 is a flow chart illustrating the processing steps of transmitting data according to the second embodiment.

When the information about storing data from different streams indicates that data from different streams is to be stored for the target stream (Step S41, YES), the target data is stored in the buffer 29 together with data from other streams (Step S51), as illustrated in FIG. 11. Subsequently, it is determined whether or not the extension time of the target stream is zero (Step S52). When the extension time of the target stream is zero (Step S52, NO), the target data is transmitted from the transmission processing unit 30 (Step S34), and the processing ends. When the extension time of the target stream is not zero (Step S52, YES), the timer is initiated (Step S53), and the processing ends. When time-out occurs in the timer initiated in Step S53, "Processing Carried Out When Time-out Occurs in Timer" described below is carried out.

<Processing Carried Out When Time-out Occurs in Timer>

Figure 12:
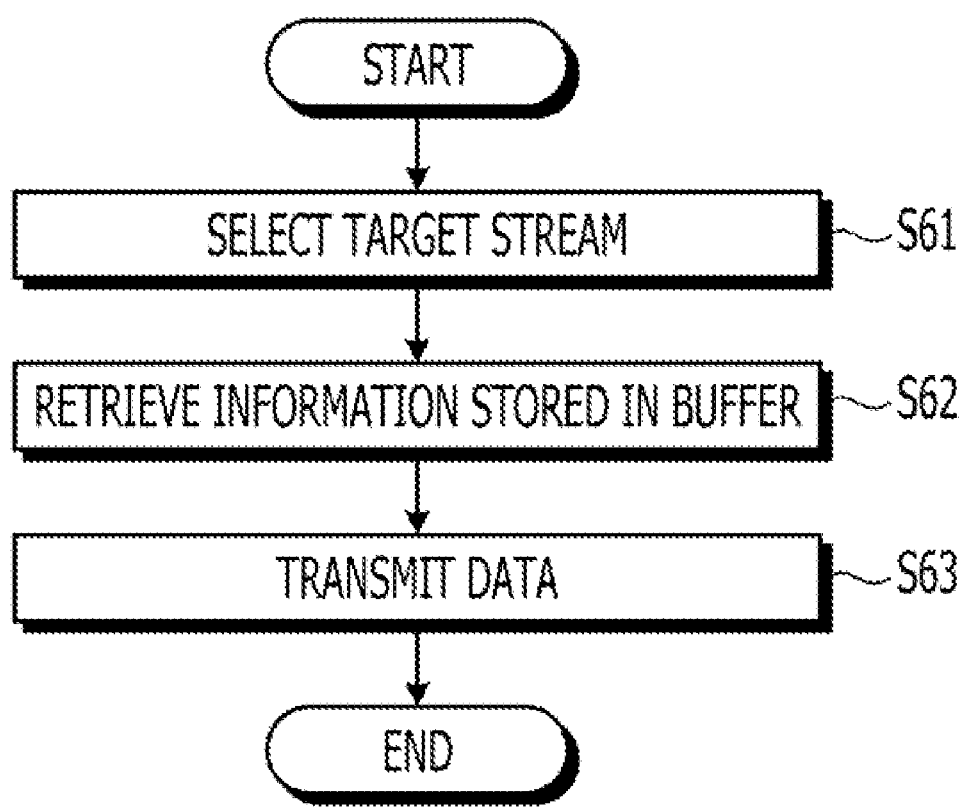
FIG. 12 is a flow chart illustrating the processing steps of when time-out occurs in the timer according to the second embodiment.

FIG. 12 is a flow chart illustrating the processing steps carried out when time-out occurs in the timer according to the second embodiment. As illustrated in FIG. 12, when processing begins when time-out occurs in the timer, first, the stream in which the time-out occurred in the timer is selected as the target stream from the option information about priority stored in the table 28 (Step S61). Information related to the target stream stored in the buffer 29 is retrieved (Step S62), the target data is transmitted from the transmission processing unit 30 (Step S63), and the processing ends.

<Communication Method>

Figure 13:
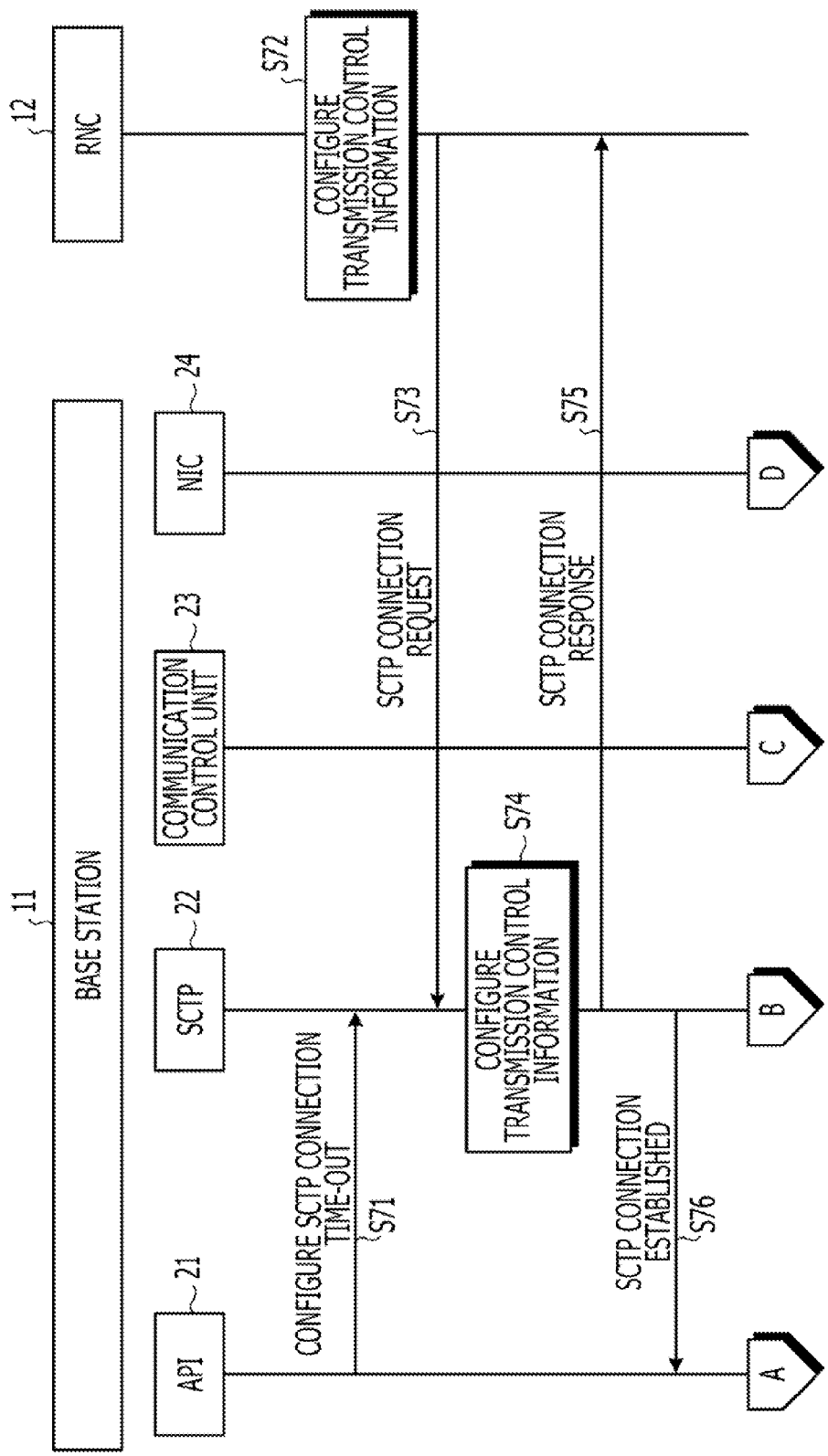
FIG. 13 is a sequence diagram illustrating a communication method according to the second embodiment.
Figure 14:
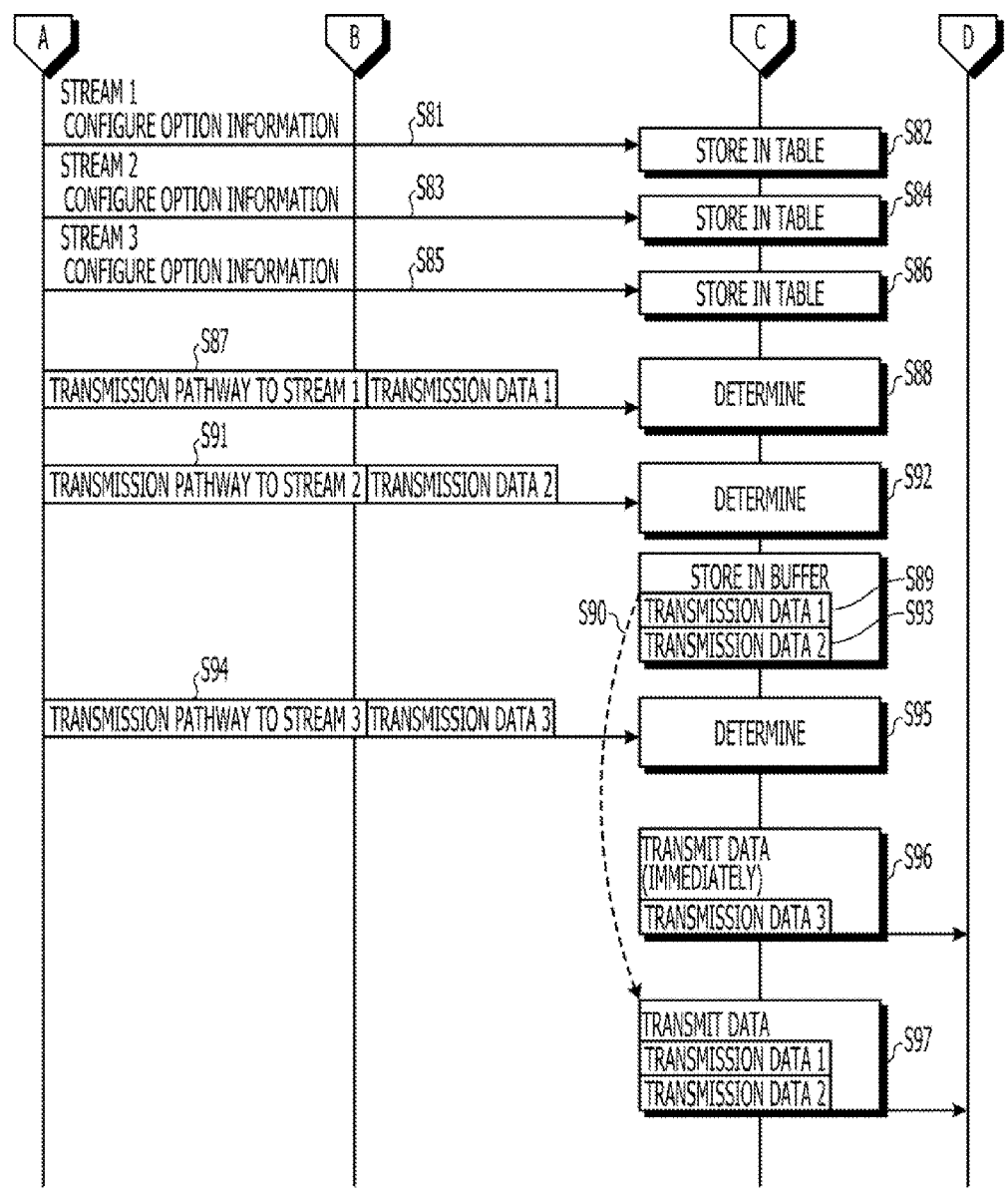
FIG. 14 is a sequence diagram illustrating a communication method according to the second embodiment.

FIGS. 13 and 14 are sequence diagrams illustrating a communication method according to the second embodiment. As illustrated in FIG. 13, when communication begins between the base station 11 and the RNC 12, first, the API 21 of the base station 11 sets a connection time-out in an SCTP for the SCTP 22 of the base station 11 (Step S71). The RNC 12 configures control information for transmitting signal to the base station 11 (Step S72), and requests connection in an SCTP to the SCTP 22 of the base station 11 (Step S73). The SCTP 22 of the base station 11 receives the connection request from the RNC 12 and configures control information for communicating with the RNC 12 (Step S74). The SCTP 22 of the base station 11 sends a response to the communication request from the RNC 12 to the RNC 12 (Step S75). The SCTP 22 of the base station 11 reports the establishment of a connection in an SCTP to the API 21 of the base station 11 (Step S76). Through the processing up to this step, the association 13 is established between the base station 11 and the RNC 12. However, in an SCTP, a subsequent step of authenticating the establishment of the association may be carried out. This step may be carried out by employing a well-known technology, and thus, only the establishment of the final connection (establishment of association) will be described here.

As illustrated in FIG. 14, the API 21 of the base station 11 configures the option information for each stream. Here, as an example, option information is set for streams 1, 2, and 3. The API 21 of the base station 11 configures the option information for the streams 1, 2, and 3 (Steps S81, S83, and S85). The option information for the streams is stored in the table 28 in the communication control unit 23 of the base station 11 (Steps S82, S84, and S86). As an example, as illustrated in FIG. 6, option information for the streams 1 and 2, data from different streams is to be stored, extension time is 200 ms, and extension is to be carried out again. For the option information for the stream 3, data is not to be accumulated, data from different streams is not to be stored, extension time is 0 ms, and extension is not to be carried out again.

Subsequently, when data is transmitted from the API 21 of the base station 11 to the stream 1 (Step S87), the table 28 in the communication control unit 23 of the base station 11 determines, on the basis of the information stored in the table 28, the processing to be carried out on the stream (Step S88). In the example illustrated in FIG. 6, since data is to be accumulated, data from the stream 1 is stored in the buffer 29 in the communication control unit 23 of the base station 11 (Step S89). Moreover, since the extension time of the stream is set to 200 ms, the timer unit 31 for the stream 1 in the communication control unit 23 is initiated (Step S90). Accordingly, after 200 ms, data to the streamed 1 is transmitted from the transmission processing unit 30 to the association 13.

When data is transmitted from the API 21 of the base station 11 to the stream 2 (Step S91), similar as Steps 87 to 90, data to the stream 2 is stored in the buffer 29 in the communication control unit 23 of the base station 11 (Steps S92 and S93). At this time, in the example illustrated in FIG. 6, since data is to be accumulated for the streams 1 and 2, the data to the stream 2 is stored in the buffer 29, which is the same buffer the data to the stream 1 is stored. Furthermore, the timer unit 31 in the communication control unit 23 is initiated for the stream 2 (Step S90). Accordingly, after 200 ms, the data to the stream 2 is transmitted from the transmission processing unit 30 to the association 13.

Subsequently, when the data is transmitted from the API 21 of the base station 11 to the stream 3 (Step S94), the table 28 in the communication control unit 23 of the base station 11 determines, on the basis of the information stored in the table 28, the processing to be carried out on the stream (Step S95). At this time, the streams 1 and 2 in which the extension is to be carried out again are configured such that time-out occurs in the timer unit 31 of the communication control unit 23 after 200 ms. In the example illustrated in FIG. 6, for the stream 3, data is not to be accumulated, data from different streams is not to be stored, extension time is 0 ms, and extension is not to be carried out again. Thus, the data to the stream 3 is not stored in the buffer 29 in the communication control unit 23 of the base station 11 and is transmitted from the transmission processing unit 30 of the communication control unit 23 of the base station 11 to the association 13 (Step S96). Subsequently, when time-out occurs in the timer unit 31 in the communication control unit 23 initiated in Step S90, the data stored in Steps S89 and S93 in the buffer 29 of the communication control unit 23 of the base station 11 is transmitted from the transmission processing unit 30 of the communication control unit 23 of the base station 11 to the association 13 (Step S97).

When communication begins between the base station 11 and user terminals, for example, the RNC 12 receives a radio resource control (RRC) connection request. Since this RRC connection request includes information related to the user terminal (e.g., initial UE ID, which is a terminal identifier), the RNC 12 can recognize the information related to the user terminal. When the RNC 12 requests connection by SCTP to the SCTP 22 of the base station 11 (FIG. 13, Step S73), the base station 11 can recognize the information related to the user terminal by including the information related to the user terminal in the request. Accordingly, the base station 11 can allocate the user terminal to one of the streams 14. For example, by allotting terminals related to a police department and a fire department to the stream 3 of FIG. 6, which is described above as an example, communication with these terminals related to the police department and the fire department will be prioritized.

According to the second embodiment, since the order of priority is set for the streams on the basis of the option information and the transmission order of data sent through the streams is controlled on the basis of the order of priority, data can be transmitted from the base station in accordance with the order of priority. Consequently, even when a stream is transmitting a large amount of data, data sent through a stream with higher priority than the former stream can be transmitted with priority. Moreover, even when data is requested to be resent through a stream that is transmitting a large amount of data or a stream in which data transmission is disrupted due to failure, before starting the resending operation, data of higher priority sent through other streams can be transmitted with priority. When the option information indicates that data is not to be accumulated, data in the corresponding stream can be transmitted substantially immediately from the base station without accumulating it in a buffer.

Third Embodiment

A third embodiment is similar to the second embodiment except that the order of priority is set in accordance with the type of signal included in the data to the streams 14. For example, even for data to a same stream 14, the orders of priority differ for data including a control signal and data including a data signal.

<Example Table>

FIG. 15 illustrates an example table according to the third embodiment. As illustrated in FIG. 15, in addition to the option information according to the second embodiment, option information about a selected signal and transmission order is stored in the table 28. Thus, in this embodiment, the configuration unit 25 configures option information to include information about stream number, selected signal, transmission order, data accumulation, storing data from different streams, extension time, and re-extension.

The information about a selected signal may indicate the type of signal included in the data. For example, the option information indicating that the selected signal is a data signal may be applied to data including a data signal. Also, the option information indicating that the selected signal is a control signal may be applied to data including a control signal. Furthermore, the option information indicating that a selected signal is not identified may be applied to both data including a data signal and data including a control signal. The information about the transmission order indicates the transmission order of the data stored in the buffer 29. For example, when the transmission order is first in, first out (FIFO), data stored first in the buffer 29 is transmitted first. When the transmission order is last in, first out (LIFO), data stored last in the buffer 29 is transmitted first.

<Transmission Method>

Figure 16:
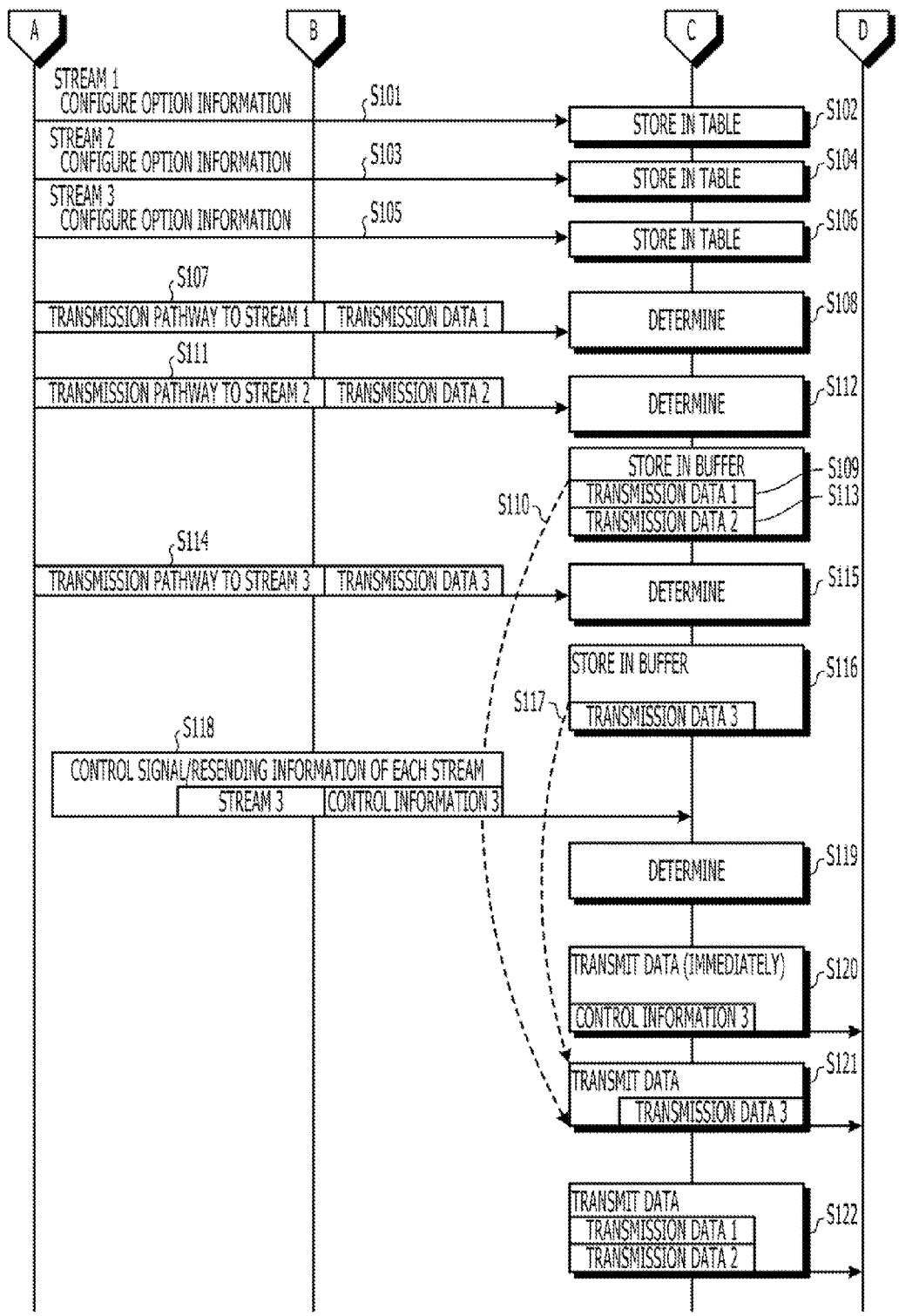
FIG. 16 is a sequence diagram illustrating a communication method according to the third embodiment.

FIG. 16 is a sequence diagram illustrating a communication method according to the third embodiment. The processing of establishing the association 13 between the base station 11 and the RNC 12 is similar to the processing according to the second embodiment illustrated in FIG. 13. As illustrated in FIG. 16, Steps S101 to S113 are the same as Steps S81 to S93, respectively, in the processing according to the second embodiment illustrated in FIG. 14. However, FIG. 15 illustrates an example, in which the option information for the streams 1 and 2 indicate that the selected signal is not to be identified, the transmission order is FIFO, data is to be accumulated, data from different streams is to be stored, extension time is 200 ms, and extension is to be carried out again. For the stream 3, option information for a data signal and option information for a control signal are provided. The option information for a data signal associated with stream 3 according to FIG. 15 indicates that the selected signal is a data signal, the transmission order is FIFO, data is to be accumulated, data from different streams is to be stored, extension time is 10 ms, and extension is not to be carried out again. The option information for a control signal associated with stream 3 according to FIG. 15 indicates that the selected signal is a control signal, the transmission order is LIFO, data is not to be accumulated, data from different streams is not to be stored, extension time is 0 ms, and extension is not to be carried out again.

When data (including a data signal) is transmitted from the API 21 of the base station 11 to the stream 3 (Step S114), the table 28 in the communication control unit 23 of the base station 11 determines the processing to be carried out on the stream 3 on the basis of the information stored in the table 28 (Step S115). In the example illustrated in FIG. 15, for the data signal of the stream 3, since data is to be accumulated and data from different streams is to be stored, the data including the data signal to the stream 3 is stored in a buffer 29 different from that in which data to the streams 1 and 2 is stored (Step S116). Since extension time is set to 10 ms for the data signal in the stream 3, the timer unit 31 in the communication control unit 23 for the data signal in the stream 3 is initiated (Step S117). Accordingly, the data including the data signal to the stream 3 is transmitted from the transmission processing unit 30 to the association 13 after 10 ms.

Subsequently, when data (including the control signal) from the SCTP 22 to the base station 11 to the stream 3 is transmitted (Step S118), the table 28 in the communication control unit 23 of the base station 11 determines the processing to be carried out on the stream on the basis of the information stored in the table 28 (Step S119). At this time, for the streams 1 and 2 for which extension is to be carried out again, the timer unit 31 in the communication control unit 23 is set such that time-out occurs after 200 ms. In the example illustrated in FIG. 15, since, for the control signal of the stream 3, data is not to be accumulated and the transmission order is LIFO, the data including the control signal to the stream 3 is not stored in the buffer 29 in the communication control unit 23 of the base station 11 but is transmitted from the transmission processing unit 30 of the communication control unit 23 of the base station 11 to the association 13 (Step S120).

Subsequently, when time-out occurs in the timer unit 31 in the communication control unit 23 initiated in Step S117, the data (data including the data signal to the stream 3) stored in the buffer 29 in the communication control unit 23 of the base station 11 in Step S116 is transmitted from the transmission processing unit 30 of the communication control unit 23 of the base station 11 to the association 13 (Step S121). Furthermore, when time-out occurs in the timer unit 31 of the communication control unit 23 initiated in Step S110, the data stored in the buffer 29 in the communication control unit 23 of the base station 11 in Steps S109 and 113 is transmitted from the transmission processing unit 30 of the communication control unit 23 of the base station 11 to the association 13 (Step S122). In the third embodiment, the transmission unit 26 and the SCTP 22 of the base station 11 are equivalent to a data source.

For the control signal in the stream 3, data may be accumulated. In such a case, the data including the control signal to the stream 3 is stored in the buffer 29 in the communication control unit 23 of the base station 11. Subsequently, the data including the control signal to the stream 3 is transmitted first to the association 13 (since the transmission order is LIFO), and the data including the data signal to the stream 3 is transmitted later to the association 13.

According to the third embodiment, similar advantages as those according to the second embodiment are achieved. Since the order of priority can be set in accordance with the type of signal, a data signal can be transmitted after a control signal is transmitted to an association. Moreover, since the transmission order can be set for each stream or signal type, the transmission order of data can be controlled precisely.

This embodiment can be applied to systems other than communication systems meeting the standard by 3GPP so long as the system is a communication system that transmits data by configuring a plurality of virtual communication pathways in a physical communication pathway established between communication apparatuses. The protocol is not limited to an SCTP so long as it enables transmission of data by configuring a plurality of virtual communication pathways in a physical communication pathway established between communication apparatuses. The first communication apparatus is not limited to a base station, and the second communication apparatus is not limited to an RNC.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A communication apparatus configured to transmit data by configuring a plurality of virtual communication pathways in a physical communication pathway established with another communication apparatus, the communication apparatus comprising:
   a configuration unit that configures, for each of one or more virtual communication pathways included in the plurality of virtual communication pathways, option information for controlling an order of priority of transmitting stream data included in a data stream passing through the each virtual communication pathway, the option information including a stream number identifying the data stream in association with a first extension time indicating a time period for which transmission of the stream data is to be delayed;
   a first storage unit that stores the configured option information in association with the each virtual communication pathway;
   a second storage unit that stores the stream data, based on the configured option information; and
   a transmission processing unit that transmits the stream data to the another communication apparatus via the each virtual communication pathway, by controlling transmission timing of the stream data based on the first extension time included in the option information configured for the each virtual communication pathway, wherein
   the option information further includes signal identification information identifying a type of signal included in the stream data, in association with a second extension time indicating a time period for which transmission of the type of signal is to be delayed; and
   the transmission timing of each type of signal included in the stream data is controlled based on the second extension time associated with the each type of signal so that the different types of signals included in the stream data are transmitted to the another communication apparatus via the each virtual communication pathway at the respective different transmission timings in an order of priorities of the different types of signals.

2. The communication apparatus according to claim 1, wherein the configured option information includes transmission order information indicating a transmission order of the each type of signal included in the stream data.

3. The communication apparatus according to claim 1, wherein the stream data includes, as types of signals, a data signal and a control signal, and the configured option information includes, as the signal identification information, information identifying one of the data signal and control signal.

4. The communication apparatus according to claim 1, wherein the data stream is in the form of a packet stream.

5. The communication apparatus according to claim 1, wherein
   the configured option information further includes data accumulation information indicating whether the stream data is to be buffered or not; and the stream data is immediately transmitted without being stored in the second storage unit when the data accumulation information indicates that the stream data is not to be buffered.

6. A communication system for transmitting data by configuring a plurality of virtual communication pathways in a physical communication pathway established between a first communication apparatus and a second communication apparatus, the system comprising:
   the first communication apparatus; and
   the second communication apparatus, wherein
   the first and second communication apparatuses each include:
      a configuration unit that configures, for each of one or more virtual communication pathways included in the plurality of virtual communication pathways, option information for controlling an order of priority of transmitting stream data included in a data stream passing through the each virtual communication pathway, the option information including a stream number identifying the data stream and a first extension time indicating a time period for which transmission of the stream data is to be delayed;

a first storage unit that stores the configured option information in association with the each virtual communication pathway;

a second storage unit that stores the stream data based on the configured option information; and a transmission processing unit that transmits the stream data to the another communication apparatus via the each virtual communication pathway, by controlling transmission timing of the stream data based on the first extension time included in the option information configured for the each virtual communication pathway, wherein the option information further includes signal identification information identifying a type of signal included in the stream data, in association with a second extension time indicating a time period for which transmission of the type of signal is to be delayed; and the transmission timing of each type of signal included in the stream data is controlled based on the second extension time associated with the each type of signal so that the different types of signals included in the stream data are transmitted to the another communication apparatus via the each virtual communication pathway at the respective different transmission timings in an order of priorities of the different types of signals.

7. The communication system according to claim 6, wherein
the configured option information includes transmission order information indicating a transmission order of the each type of signal included in the stream data.

8. The communication system according to claim 6, wherein
the stream data includes, as types of signals, a data signal and a control signal, and the configured option information includes, as the signal identification information, information identifying one of the data signal and control signal.

9. The communication system according to claim 6, wherein
the data stream is in the form of a packet stream.

10. A method of communicating with a communication apparatus using a plurality of virtual communication pathways included in a physical communication pathway, the method comprising:

configuring, for each of one or more virtual communication pathways included in the plurality of virtual communication pathways, option information for controlling an order of priority of transmitting stream data included in a data stream passing through the each virtual communication pathway, the option information including a stream number identifying the data stream in association with a first extension time indicating a time period for which transmission of the stream data is to be delayed;

storing the configured option information in association with the each virtual communication pathway;

storing the stream data, based on the configured option information; and transmitting the stream data to the another communication apparatus via the each virtual communication pathway, by controlling transmission timing of the stream data based on the first extension time included in the option information configured for the each virtual communication pathway, wherein the option information further includes signal identification information identifying a type of signal included in the stream data, in association with a second extension time indicating a time period for which transmission of the type of signal is to be delayed; and the transmission timing of each type of signal included in the stream data is controlled based on the second extension time associated with the each type of signal so that the different types of signals included in the stream data are transmitted to the another communication apparatus via the each virtual communication pathway at the respective different transmission timings in an order of priorities of the different types of signals.

11. The method of claim 10, wherein
the configured option information includes transmission order information indicating a transmission order of the each type of signal included in the stream data.

12. The method of claim 10, wherein
the stream data includes, as types of signals, a data signal and a control signal, and the configured option information includes, as the signal identification information, information identifying one of the data signal and control signal.

13. The method of claim 10, wherein the data stream is in the form of a packet stream.

14. The method of claim 10, wherein
the configured option information further includes data accumulation information indicating whether the stream data is to be buffered or not; and the stream data is immediately transmitted without being buffered when the data accumulation information indicates that stream data is not to be buffered.

* * * * *